United States Patent
Bartocci

[11] Patent Number: 6,148,491
[45] Date of Patent: Nov. 21, 2000

[54] METHOD FOR FABRICATING A REINFORCED FOIL-TYPE COATING MATERIAL WITH A LOW FRICTIONAL COEFFICIENT

[75] Inventor: Marcel Bartocci, Langres, France

[73] Assignee: Compagnie Plastic Omnium, Lyons, France

[21] Appl. No.: 08/343,965

[22] Filed: Nov. 18, 1994

[30] Foreign Application Priority Data

Nov. 18, 1993 [FR] France .................................. 93 13793

[51] Int. Cl.⁷ .................................................. B21D 33/00
[52] U.S. Cl. ............................ 29/17.3; 29/898; 29/469.5; 156/91; 156/309.6
[58] Field of Search ................................ 29/17.3, 432.1, 29/432.2, 898.12, 898.13, 898.15, 898, 6.1, 469.5; 156/91, 289, 309.6, 92; 428/545, 608, 269; 384/300

[56] References Cited

U.S. PATENT DOCUMENTS

| | | | |
|---|---|---|---|
| 2,066,475 | 1/1937 | Kramig et al. | 156/92 X |
| 2,768,925 | 10/1956 | Fay, Jr. | 29/898.12 X |
| 2,879,587 | 3/1959 | Mushovic et al. | 29/17.3 X |
| 2,995,462 | 8/1961 | Mitchell et al. | 29/898.12 X |
| 3,058,864 | 10/1962 | Pechin, Jr. | 156/91 X |
| 3,214,564 | 10/1965 | Katzer et al. | 428/608 X |
| 3,607,594 | 9/1971 | Mancel | 156/333 |
| 3,687,798 | 8/1972 | Humphries | 428/608 X |
| 4,208,472 | 6/1980 | Cho et al. | 29/898.12 X |
| 4,846,590 | 7/1989 | Teramachi | 384/300 X |
| 5,179,770 | 1/1993 | Block et al. | 29/17.3 |
| 5,229,198 | 7/1993 | Schroeder | 384/300 X |
| 5,419,024 | 5/1995 | Koontz et al. | 29/432.2 X |

FOREIGN PATENT DOCUMENTS

| | | |
|---|---|---|
| 0 040 448 | 11/1981 | European Pat. Off. . |
| 2 445 210 | 7/1980 | France . |
| 3304141 A1 | 8/1984 | Germany . |
| 3922052 A1 | 1/1991 | Germany . |
| 4101845 | 4/1992 | Japan ...................... 29/17.3 |
| 481327 | 3/1938 | United Kingdom ............ 156/309.6 X |

Primary Examiner—P. W. Echols
Attorney, Agent, or Firm—Oliff & Berridge, PLC

[57] ABSTRACT

A method for fabricating a self-lubricating foil-type material having a low frictional coefficient from a stack of an expanded-metal sheet and at least one polytetrafluoroethylene (PTFE) strip by compression and heating. The stack is first calendered and then the calendered stack is heated to sinter the PTFE.

13 Claims, 2 Drawing Sheets

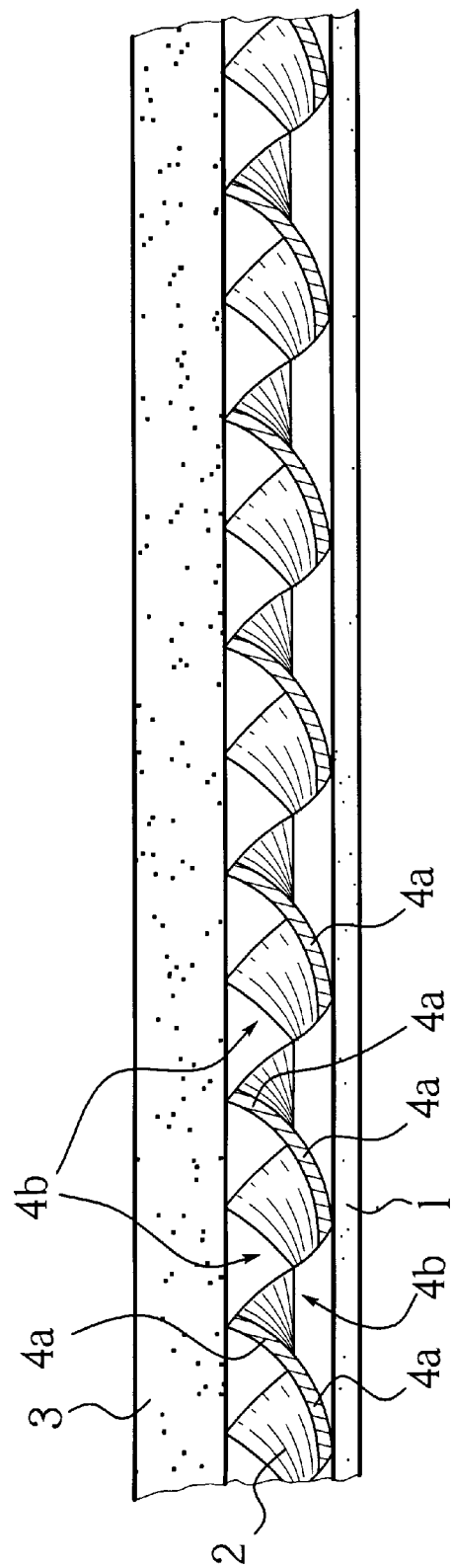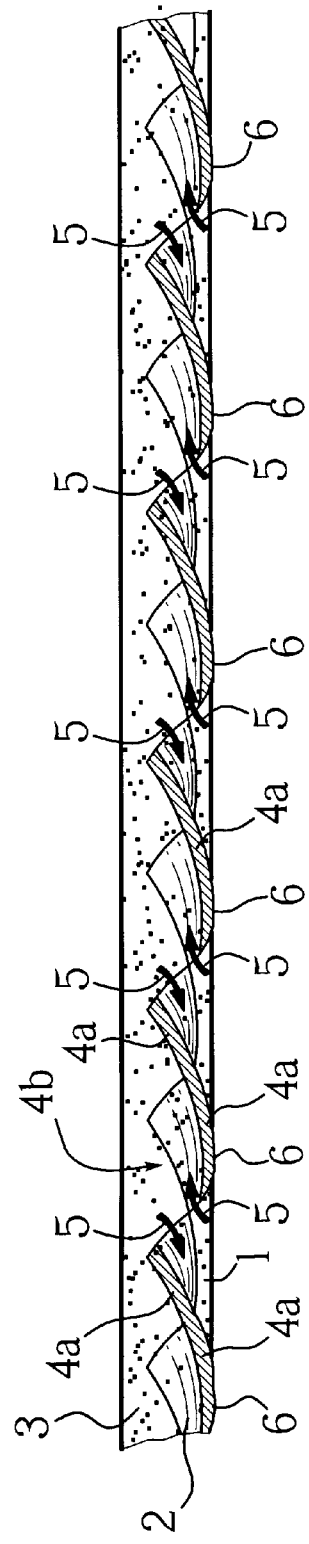

METHOD FOR FABRICATING A REINFORCED FOIL-TYPE COATING MATERIAL WITH A LOW FRICTIONAL COEFFICIENT

FIELD OF THE INVENTION

The present invention relates to a method for fabricating a foil-type coating material with a metal reinforcement, having a low frictional coefficient, and a material obtained according to this method.

BACKGROUND

Foil-type coating materials composed of a metal fabric coated with a fluorinated polymer are known in the art.

Due to their relatively low friction coefficients, such materials are sometimes designated "self-lubricating" and are used, for example, for making liners for sleeves or bearings, particularly for use in automobile door hinges and for guiding sliding shafts.

Thus reinforced, the fluorinated material has better dimensional stability, mainly because the metal reinforcement considerably limits creep of the fluorinated polymer.

However, these foil-type materials usually have the substantial drawback that, when they are cut, the metal strands at the cut edge of the foil tend to fray, weakening the edge of the foil.

Moreover, under certain application conditions, the fluorinated polymer creeps despite the presence of the metal reinforcement.

FR-A-2 445 210 teaches a method for fabricating a foil-type material having a metal lattice structure, particularly of expanded metal, coated on each face with a strip of polytetrafluoroethylene.

This method calls for hot-pressing the assembly thus formed in a mold to reach a pressure of between 20 and 200 kg/cm$^2$.

However, such pressures have proved inadequate for obtaining a strong, reliable material.

In addition, according to this method, the time the assembly remains in the heated mold is approximately two hours, which is unsuitable for mass production of the material, especially as the aforesaid document calls for cooling the material under pressure when it leaves the mold.

SUMMARY OF THE INVENTION

The goal of the present invention is to make a self-lubricating foil-type coating material with a low frictional coefficient which, in particular, does not exhibit the drawbacks listed above.

The present invention relates to a method for fabricating a self-lubricating foil-type material with a low frictional coefficient from a stack of an expanded-metal sheet and at least one polytetrafluoroethylene (PTFE) strip by compression and heating, characterized in that first the stack is calendered and then the calendered stack is heated to sinter the PTFE.

BRIEF DESCRIPTION OF THE DRAWINGS

FIG. 1 is a cross section through the foil-type material according to the invention before compression, FIG. 2 is a cross section of the material after compression.

DESCRIPTION OF PREFERRED EMBODIMENTS

Figure 3:
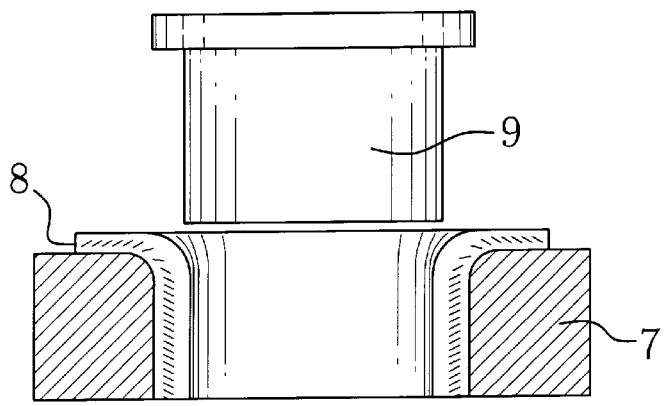
FIGS. 3 and 4 illustrate one embodiment of the foil-type material according to the invention.

According to the invention, "expanded-metal sheet" is a metal sheet obtained by cutting out strips from a metal foil and stretching these strips in an oblique direction relative to the plane of the metal foil.

The foil-type coating material obtained by implementing the method according to the invention can be cut without having to be edged, as the cutting edge of the foil has essentially the same strength and homogeneity as the remainder of the foil.

In addition, the foil-type material according to the invention has optimum structural homogeneity so that it can be folded or shaped without difficulty.

In fact, the compression obtained by calendering the stack, which enables high pressures, preferably approximately 500 kg/cm$^2$, to be attained, causes the PTFE to penetrate between the strips of expanded metal then causes partial crushing of the expanded-metal strips, which move toward one another trapping the PTFE between them.

This causes the PTFE to attach mechanically to the expanded metal, which mechanical attachment is added to the bonds obtained by subsequent sintering of the PTFE.

The method according to the invention has the advantage of allowing continuous fabrication of the foil-type material using a strip of expanded metal and at least one PTFE strip, said strips being stacked and conveyed in succession through an assembly of calendering rollers and an oven, after which the formed material is allowed to cool.

When the stack is calendered, it can elongate by 10 to 25%.

In a preferred embodiment, two PTFE strips are disposed on either side of the expanded-metal sheet.

The PTFE can be natural or contain, in particular, dye pigments.

It is preferable to use untreated PTFE. If cured PTFE is used, after the coating foil has been cold-calendered, the PTFE is sintered by simultaneous heating and compression.

Advantageously, fibrous PTFE obtained by lubricated extrusion is used. This type of extrusion consists of compressing a mixture of PTFE powder and approximately 20% lubricant to extrude it in strip form, leading to production of fibers or fibrils oriented in the flow direction of the material.

The expanded metal usable according to the invention can be mild steel, stainless steel, a coated steel, or alloys of copper, brass, bronze, nickel, zinc, or precious metals.

The present invention also relates to a foil-type material obtained by implementing the method described hereinabove.

For a better understanding of the invention, one embodiment will now be described with reference to the Figures.

To produce a foil-type coating material according to FIGS. 1 and 2, a first strip of untreated PTFE 1, 0.15 mm thick, then an expanded bronze foil 2, 0.35 mm thick, and a second PTFE strip 3 approximately 0.45 mm thick are superimposed in succession. The two strips were obtained by lubricated extrusion and have a density of 1.6.

The structure so created is calendered to reach a thickness of approximately 0.5 mm.

As can be seen in FIG. 2, in the calendering stage, the PTFE penetrates between strips 4a and hence into the meshes 4b of the expanded metal as indicated by arrows 5. Simultaneously, meshes 4b close partially by the coming together of strips 4a, trapping part of the PTFE which has flowed between strips 4a.

This produces mechanical attachment of the two sheets of PTFE on the expanded metal.

As can be seen from FIG. 2, strips 4a of the expanded-metal sheet 2 located alongside the thinnest PTFE layer 1 protrude from this face of the foil-type material after calendering and have exposed parts 6.

This arrangement allows the foil-type material thus obtained to be attached to a surface, not shown, which will later be coated with a glue that adheres to the exposed parts 6 of metal strips 4a.

The calendered material is then conveyed continuously through an oven to sinter the PTFE by heating it to a temperature of approximately 390° C. The residence time in the oven is approximately 20 minutes.

When it leaves the oven, the material is once again calendered to reach the desired calibrated thickness, then cooled in air.

Figure 4:
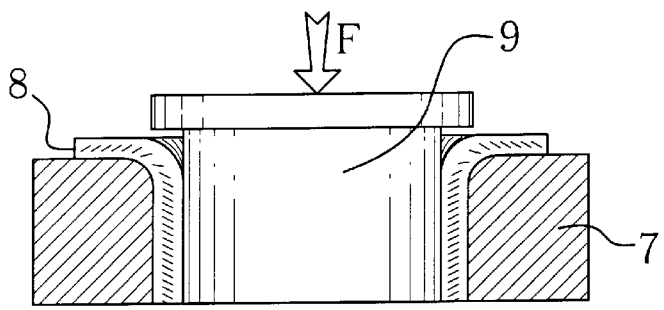

FIGS. 3 and 4 show an assembly of rings intended to hold a rotationally driven mechanical part.

In these figures, a steel ring 7 is lined on the inside with a ring 8 composed of a foil-type material according to the invention, made from PTFE.

The assembly thus constituted has a 10 mm bore with a maximum play of 0.035 mm (tolerances H7/g6).

A steel rotating part 9 with a diameter of 10.5 mm is designed to engage in the assembly and be held there during its rotational movement.

As can be seen in FIG. 4, application of a force F equivalent to the weight of a 40 kg weight allows part 9 to be mounted in the ring assembly.

The low frictional coefficient of the PTFE and its good creep strength obtained related to the presence of the expanded-metal sheet allows ring 8, which has sufficient elasticity to offset the increase in the inside diameter of the assembly, to be held.

Once engaged in rings 7 and 8, part 9 can be made to rotate with a drive torque less than 1 M/kg, which is entirely suitable for the use of such an assembly for making automobile door hinges.

Figure 5:
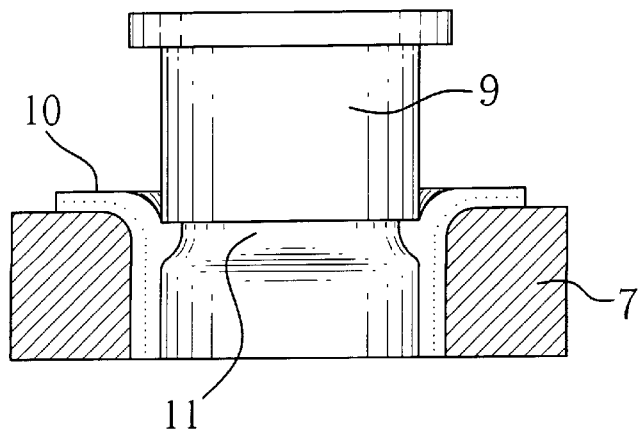
FIG. 5 illustrates a comparative example of using a foil-type material in the prior art subject to the same conditions as the example in FIGS. 3 and 4.

In the comparative example illustrated in FIG. 5, steel ring 7 is lined on the inside with a ring 10 made of a foil-type material from the prior art.

It can be seen from FIG. 5 that introduction of mechanical part 9 causes the PTFE to creep, forming a bulge 11 in front of part 9.

The presence of an expanded-metal sheet according to the invention as a metal reinforcement has the advantage of improving the elasticity of the material while retaining the good attachment characteristics to the reinforcement as well as the creep strength of the polytetrafluoroethylene.

While the invention has been described in detail and with reference to specific examples thereof, it will be apparent to one skilled in the art that various changes and modifications can be made therein without departing from the spirit and scope thereof.

What is claimed is:

1. A method for fabricating a self-lubricating foil-type material, comprising:

contacting an expanded-metal sheet and at least one polytetrafluoroethylene (PTFE) strip to form a stack;

calendering said stack to at least partially crush said expanded-metal sheet; and heating the calendered stack to sinter said PTFE, thereby forming said foil-type material.

2. The method according to claim 1, wherein said expanded-metal sheet is provided by cutting out strips from a metal foil and stretching said strips in an oblique direction relative to a plane of said metal foil.

3. The method according to claim 1, wherein said calendering elongates said stack by 10 to 25%.

4. The method according to claim 1, wherein said calendering subjects said stack to a pressure greater than 200 kg/cm$^2$.

5. The method according to claim 1, wherein said calendering subjects said stack to a pressure of approximately 500 kg/cm$^2$.

6. The method according to claim 1, wherein said stack comprises one said PTFE strip located on each face of said expanded-metal sheet.

7. The method according to claim 1, wherein said PTFE is fibrous.

8. The method according to claim 1, wherein said foil-type material is continuously made by contacting a continuous strip of said expanded-metal sheet and a continuous strip of said at least one PTFE strip to form said stack and successively conveying said stack through calendering rollers and an oven.

9. The method according to claim 1, wherein said calendered stack is heated for not more than about twenty minutes to sinter said PTFE.

10. A method for fabricating a self-lubricating foil-type material, comprising:

contacting an expanded-metal sheet and at least one polytetrafluoroethylene (PTFE) strip to form a stack;

calendering said stack at a pressure of greater than 200 kg/cm$^2$ to at least partially crush said expanded-metal sheet; and heating the calendered stack to sinter said PTFE, thereby forming said foil-type material.

11. A method according to claim 10, wherein said calendering elongates said stack by 10 to 25%.

12. A method according to claim 11, wherein said calendering subjects said stack to a pressure of approximately 500 kg/cm$^2$.

13. The method according to claim 10, wherein said calendered stack is heated for not more than about 20 minutes to sinter said PTFE.

* * * * *